United States Patent
Dunlop et al.

(10) Patent No.: US 11,107,087 B2
(45) Date of Patent: Aug. 31, 2021

(54) MOBILE FIELD ARTICLE IDENTIFICATION SYSTEM AND METHOD

(71) Applicant: YPB Group Limited, Sydney (AU)

(72) Inventors: Anthony J. Dunlop, Beijing (CN); David Kinsman, Beijing (CN); John M. N. Houston, Beijing (CN)

(73) Assignee: YPB Group Limited, Sydney (AU)

( * ) Notice: Subject to any disclaimer, the term of this patent is extended or adjusted under 35 U.S.C. 154(b) by 355 days.

(21) Appl. No.: 14/441,470

(22) PCT Filed: Mar. 26, 2014

(86) PCT No.: PCT/CN2014/074125
§ 371 (c)(1),
(2) Date: May 7, 2015

(87) PCT Pub. No.: WO2014/154142
PCT Pub. Date: Oct. 2, 2014

(65) Prior Publication Data
US 2015/0262194 A1   Sep. 17, 2015

(30) Foreign Application Priority Data
Mar. 29, 2013 (CN) .......................... 201310109929.3

(51) Int. Cl.
*G06Q 20/38* (2012.01)
*G06Q 30/00* (2012.01)
*G06Q 30/06* (2012.01)

(52) U.S. Cl.
CPC ......... *G06Q 30/0185* (2013.01); *G06Q 30/06* (2013.01)

(58) Field of Classification Search
CPC .................................................... G06Q 30/018
(Continued)

(56) References Cited

U.S. PATENT DOCUMENTS 7,030,371 B2   4/2006 Vasic et al.
7,067,824 B2   6/2006 Muller et al.
(Continued)

FOREIGN PATENT DOCUMENTS

CN   1292633 A    4/2001
CN   101556653 A  10/2009
(Continued)

OTHER PUBLICATIONS

The International Search Report dated Jun. 23, 2014, in International application No. PCT/CN2014/074125 (5 pages, including English Translation).

(Continued)

*Primary Examiner* — Chinedu C Agwumezie
(74) *Attorney, Agent, or Firm* — McCarter & English, LLP (57) ABSTRACT

The disclosure relates to a system and method for consumers to identify articles at a place of sales before purchasing, which are high in security level, low in cost, mobile, high in availability and easy to use. The system and the method are based upon capture of the physical and logic features of a security label containing at least two security tracers applied to an article, and also upon local or remote processing, and at least one of the tracers comprises an invisible energy response material. The identification operation can be performed in a special and offline way by any system of registered consumers through a mobile communication device that has an image capture component and is combined with other particular functions of system software.

18 Claims, 6 Drawing Sheets

Identification system, connection and security (58) Field of Classification Search
USPC .......................................................... 705/50
See application file for complete search history.

(56) References Cited

U.S. PATENT DOCUMENTS

| | | | |
|---|---|---|---|
| 8,536,545 | B2 | 9/2013 | Wu et al. |
| 8,759,794 | B2 | 6/2014 | Rapoport et al. |
| 8,822,954 | B2 | 9/2014 | Li et al. |
| 8,931,701 | B2 | 1/2015 | Lawandy |
| 9,183,688 | B2 | 11/2015 | Gardner et al. |
| 9,212,996 | B2 | 12/2015 | Watson et al. |
| 9,239,262 | B2 | 1/2016 | Rapoport et al. |
| 9,250,183 | B2 | 2/2016 | Smith et al. |
| 9,989,411 | B2 | 6/2018 | Deckenbach et al. |
| 2003/0136837 | A1 | 7/2003 | Amon et al. |
| 2005/0178841 | A1 | 8/2005 | Jones et al. |
| 2005/0288937 | A1* | 12/2005 | Verdiramo ......... G06Q 10/0637 705/325 |
| 2007/0017987 | A1* | 1/2007 | Lapstun ................. G06K 19/04 235/440 |
| 2009/0294534 | A1* | 12/2009 | Pepori ................. G06K 19/073 235/439 |
| 2011/0211727 | A1 | 9/2011 | Costa et al. |
| 2012/0187341 | A1 | 7/2012 | Strek et al. |
| 2012/0298743 | A1 | 11/2012 | Voloshynovskyy et al. |
| 2013/0048874 | A1 | 2/2013 | Rapoport et al. |
| 2013/0193346 | A1 | 8/2013 | Justel et al. |
| 2014/0141085 | A1* | 5/2014 | Barashkov ............ G01N 27/72 424/489 |
| 2014/0270334 | A1 | 9/2014 | Alpert et al. |
| 2015/0105284 | A1 | 4/2015 | Willson et al. |
| 2016/0078307 | A1 | 3/2016 | Pawlik et al. |
| 2016/0078706 | A1 | 3/2016 | Pawlik et al. |

FOREIGN PATENT DOCUMENTS

| | | |
|---|---|---|
| CN | 101615247 A | 12/2009 |
| CN | 101976406 A | 2/2011 |
| CN | 102446451 A | 5/2012 |
| CN | 102483810 A | 5/2012 |
| CN | 102663600 A | 9/2012 |
| CN | 102663961 A | 9/2012 |
| WO | 2006/127840 A2 | 11/2006 |

OTHER PUBLICATIONS

English Translation of the International Preliminary Report on Patentability dated Sep. 29, 2015, in International application No. PCT/CN2014/074125 (24 pages).

Office Action dated Mar. 14, 2019, issued in connection with Chinese Patent Application No. 201310109929.3 (17 pages, including English Translation).

English Translation of Office Action dated October 16, 2019, issued in connection with Chinese Patent Application No. 201310109929.3 (10 pages).

* cited by examiner

Operation and application example

MOBILE FIELD ARTICLE IDENTIFICATION SYSTEM AND METHOD

RELATED APPLICATIONS

The present application is a U.S. National Phase Application under 35 U.S.C. § 371 of International Application No. PCT/CN2014/074125 filed on Mar. 26, 2014, which claims benefit of priority to Chinese Patent Application No. 201310109929.3 filed on Mar. 29, 2013.

TECHNICAL FIELD

The present invention relates to article identification, and in particular, to an article identification system and method.

BACKGROUND ART

Forgery, piracy and illegal distribution and sales of goods may take many different forms, including but not limited to, illegal production of the whole or part of article, or its components; article package, repackaging and redistribution for sales of recalled and/or expired article; manufacturing of articles beyond mandatory security and quality standards; and sales of tampered and redistributed articles in unauthorized jurisdictions and conditions.

With respect to state-owned (including all level of national, provincial and municipal governments) and private enterprises (brand owners and supply chains thereof), these actions can lead to direct and indirect problems, including: among other things, tax loss, market share, loss of tangible and intangible corporate values and reputation associated with forgery brand, loss of national taxes and tariffs, loss of investor confidence in public and private sectors, trade loss of affected industry sectors, and regional, domestic and international job losses. In addition to financial losses, individual consumer problems include private and public security and health risks, as well as the cost of direct and indirect liabilities of many forgery articles for illness, accident and death.

With the advances in article research, development, design, manufacturing, packaging and distribution, its efficiency, trade, quality and precision have also been made significant progress. More and more brand owners need to be distinguished from other brands, in order to create and establish obviously recognized brand value, as well as to reflect a unified characteristic of conveyance in different priorities (such as quality, design, performance, taste and price). More and more brand owners spend a lot of money in protecting brands and related articles thereof in different forms of trademarks, registered designs and patents in accordance with law. However, with the development of the trade globalization, article production can produce different judicial jurisdictions in its distribution, sales and consumption. The following has been greatly exposed that the brand owners take weakly centralized control to monitor, prevent, inspect and enforce the law to reject the penetration to authorized supply chains thereof, or the influence of production and sales of counterfeited and substandard articles in gray or black markets. Similarly, the brand owners have been greatly exposed the genuine and/or genuine package outflow from authorized supply chains thereof. In addition to the improvement of the exposure, counterfeiters have now stepped up the involvement in production equipment and packaging equipment of high-quality articles, which allows them to produce a highly precise copy of the article of genuine brand owners, and, in particular, the genuine package makes it more difficult to distinguish the genuine from the forgery article.

The brand owners have made huge investment in not only the creation and protection of intellectual property rights thereof but also the sales and promotion of brands and articles thereof persistently, in order to make consumers prefer brands and articles thereof to build the trust of consumer and to affect purchasing behaviors of the consumers. When consumers believe that they have bought the genuine but purchase the forgery or substandard one, they will lose confidence in the brand owners and sales channels. In this way, the brand will fall into accusations of not doing enough to protect the interests and rights of consumers. Such damage to the reputation of the brand owners and authorized supply chains thereof may be irreversible, especially the forgery, piracy and illegal distribution of the articles have been widely distributed or become a regular and widely known, which leads to consumers' security and health crisis. For the law enforcement of such actions against intellectual property rights, it may be difficult to step over borders and regions with different legal and court systems, different law enforcement costs and processing time, as well as different punitive measures. Individual consumers often do not have the resources or do not want to and initiate or participate in such action for contingencies single object and replace it with the loss of trust in the brand owner and the system, and choose not to continue to purchase the same article from the same merchandising location.

Pirated, misappropriated, repackaged and illegally distributed and sold articles reflect another important component of forgery article trade. This is often referred to as gray market or black market transaction, in which all or part of the genuine and/or genuine package is pirated or copied and/or misappropriated as unauthorized sales through legal point of sale (gray market) or illegal point of sale (black market). These articles may include all or part of the genuine, but the distribution and sales thereof may not include any quality and security standards regarded as applicable, which will affect sales, use, performance, or consumption of these articles, especially in the conditions of selling tampered articles without showing its service life and warranty period, of unsafely storing articles, and recalling and repackaging articles. The consumer purchasing such articles in unknown condition will be in face of potential life-threatening risks, and the brand owner will also pay a huge price and suffer tremendous damage from such behavior directly and indirectly. For these reasons, the brand owners, authorized supply chains thereof and consumers also need a system to access the related article identification information, which includes but not limited to the source of manufacture, production date and batch number, product or serial number, shelf life and distribution channel information. Today there are many article tracer techniques and systems to meet these widely varied requirements, as well as means available for inventory management and product scheduling. They include 1D and 2D bar codes and radio frequency identification tags (RFID), which contains or otherwise stores article identification and distribution information. For some certain reason, the article identification and tracer techniques do not reflect effective article identification technique for daily consumables. Bar code is visible and can easily be copied, but RFID tag has been evolved into many different forms, which leads to cost increase in an unacceptably high way, including huge investment in supported IT infrastructure. This may be beyond many of the brand owner's financial capacity, and it is difficult to control or achieve the crossing of different boundaries and regions. Eventually, the tag generally containing a microscopic antenna needs to be embedded in the article and/or article package, which may be impractical for a wide variety of daily consumables. This is because that such treatment is too destructive for existing manufacturing and packaging system, or causes issues for the actual location or placement of such tag.

Therefore, there is a need for a systematic physical protection of article, which helps the brand owners and the authorized supply chains thereof as well as the consumers accurately verify the authenticity of the articles, including previous possible related article identification information at the location and point of sale. In the case of already using the article identification system and tracer information system including but not limited to article tracer techniques with 1D and 2D bar codes, it is conducive to resolving the problem of forgery and piracy. Moreover, the brand owners and the authorized supply chains are most interested in maintaining the integrity, quality and security of the distribution and sales of the genuine, and in protecting the consumers to get all of or at least part of article identification information applied to the articles and/or article packages thereof and contained in the identification method and system. Such cover enables the consumers to access the safer and complete identification information of the articles and/or packages thereof at the points of sale prior to purchasing. As the brand owners get huge benefits from such protection, they obviously need to use, especially at the points of sale prior to purchase, the universally applied technology accessed by the consumers to achieve the effective article identification system.

These articles sold or used in the conditions between the state administrative organs, and between the state administrative organ and the a large group, or a superior or high-security condition, including security files, such as passports, driving licenses, interbank certificates and other security files security files shall typically have multiple, highly-advanced security characteristics, which helps transaction stakeholders have greater financial resources and non-capital resources at their disposal to deal with the problem of forgery, including access to and implementation of identification ability and tracer technique of high-quality products most involving in highly-specialized, scientific laboratory equipment that can accurately analyze multiple security characteristics. In most cases, a huge capital investment needs to be made in these identification and tracer techniques in order to help the article manufacturers, distributors or publishers adopt them and make these security characteristics applicable in the articles. And, huge costs further incurred for the article distributors, purchasers or users are used for investment on identification equipment and system, which also incorporates various forms of technical and security training to be able to operate the relevant devices and analyze the results. Compared with more elementary article identification in the form generally applied in the daily consumable environments involved from the company to the consumers, the high-quality article identification and high-security monitoring condition may involve a relatively longer identification processing period as a rule.

Therefore, an easily-accepted and simply-operated article labeling and identification system with low cost and high level of security is in great request to be applied by the brand owners of daily consumables. As a result, the consumers are able to continue to identify all the forms of articles at a fast system response time on site at the points of sale prior to purchase across multiple merchandizing locations.

Nowadays, the popular article-based identification technique widely adopted by the consumers is dependent on the visual/explicit characteristics and includes holograms or holographic labels, security ink (such as an optically variable ink/color-conversed ink), and serialized verification labels, which are embedded into article package, or attached to the article labels and packages those provide the visual characteristics for the consumers. The visual characteristics may be used for distinguishing these articles and labels or packages thereof from those without the visual characteristics. Today, these techniques have been ordinary, not reflecting an effective barrier any more to prevent forgery. Counterfeiters not only have open channels to purchase these techniques from legitimate and illegitimate manufacturers through the Internet, but also to obtain low-cost holograms and label printing equipment for mass production of self-owned reproductions thereof. Moreover, the consumers do not have effective tools, support device or systems to effectively identify the articles and/or packages thereof without this technique at the points of sale prior to purchasing. Low-cost ultraviolet (UV) and infrared laser pointer are easily gotten by the consumers to read UV and visible IR ink, but they are not likely to distinguish between the security ink in similar forms (e.g., the results look the same when applying the UV laser pointer to the UV ink of the genuine and to another UV ink of the forgery article with the similar appearance). Therefore, the security ink is often associated with dedicated patterns within a certain range and/or more professional and expensive printing equipment that is provided with intaglio and intaglio printers and supplied under control. However, these still only provide visual or tactile characteristics, which are easily identified and replicated by the counterfeiters. More stringent printing methods, such as intaglio and gravure printing, have a limit on the article application. With respect to the daily consumable, the limit on the use of the high-quality paper of public security files, such as paper money and passport leaves over unresolved problems for the effective identification of consumables at the points of sale prior to purchasing.

A portable device is adopted for identifying the articles in U.S. Patent with No. 20120298743, which makes requirements of removing customization and being easier to use the identification device. However, the product is entirely dependent on visual product identification number (PIN), the authentication process is divided into two different stages prior to and after purchasing, and the most important processing can be done only after the purchasing, which is already too late for the articles that has been paid and may have been used or consumed prior to identification, so this authentication process has weaknesses. The PIN is usually placed in a visual way and can be easily replicated by the counterfeiters, thereby leaving over unresolved problems for the identification of consumables. These security characteristics for efficient identification method and system need to have at least one or more non-visual individual components, in order to act as higher barriers to prevent forgery. Another major weakness of treatment described is that a database of the system shows significant inaccuracy, and it is easy to damage in the event of monitoring the placement, misappropriation and purchasing of the identified the genuine and non-genuine articles. This is because the system has a limit on the possibly identified time of the article and the consumer will not have the patience to complete the identification process in case that the article has been purchased. The identification process needs to confirm the purchasing has occurred in the system. These problems of system integrity leave over the aforementioned unresolved ones for effective identification of articles at the mass market prior to purchasing. The consumers need to do complete and comprehensive identification for the articles and/or packages thereof at the points of sale prior to purchasing, which is the key part in the process of making a purchasing decision.

In a US Patent with No. 20110211727, a method for identifying articles by using a 19-character identifier applied by laser is provided in the use of cameras and phones to help consumers identify the articles and sources thereof. This method involves means of using laser to engrave the identifier in the article, which is questionable and destructive, and therefore it does not apply to all types of daily consumables. The existing manufacturing and packaging method needs additional time-consuming, expensive and destructive process, which is the main weakness of this method. It leaves over the unresolved problem that is low-cost and non-destructive application of making security labels to identify the articles by using a common device for the daily consumers at the points of sale prior to purchasing.

In a US Patent with No. 2003/0136837, application for determination and process of security labels in a wide range through different identification devices of mobile communication equipment is proposed. The described method and system are designed to supply article identification, in particular for the security files, such as bank bills and passes at the high security level those may be acquired only in the state power organs or the enterprises of the brand owners. This depends on the use of a double micro-spectrometer and a highly precise identification device of a microwave frequency generator/receiver unit. The consumers fail to obtain these highly precise identification devices, and thus leaving over the problems unresolved and faced by them. Thanks to certain reasons, these devices are not integrated into the standard mobile communication equipment. These reasons include increase in security risk of consumers, especially in the condition of the use of a laser diode and a near-infrared energy radiant device; increase in energy consumption; as well as increase in cost, appearance design and weight of the mobile phone to accommodate the additional complicated hardware and software. High-end national and enterprise identification need is in a stark contrast to the daily consumers making self-evaluation on the basic security label through their own vision or simple means without bringing attack hinder to the counterfeiters.

The WIPO patent application with No. WO/2006/127840 describes the use of a spectral sensor and a mobile phone as a further method for recognizing and identifying dedicated articles. In the method described, the additional dedicated hardware is connected to a camera to analyze, recognize or identify the complicated objects or article components, including detection and recognition of hazardous materials, measurement of blood oxygen level, and human epidermal analysis and environmental monitoring, which are too complicated and too impractical, so as not to be served as solution to meet the needs of consumers with regard to low-cost, mass market and easiness to use upon on-site identification. These methods described have obstacles in terms of unacceptable integrity, implementation, security and economic burden to the expandable, non-destructive methods and systems in the mass market of consumer's article identification, which leaves over unresolved problems for the consumer's article identification.

SUMMARY OF THE INVENTION

The principal object of an article identification system illustrated is to provide a new and novel system to daily consumers so as to be capable of easily, safely and reliably identifying articles based on daily consumers before purchasing and in points of sales, thus increasing protection on the consumers, brand owners and authorized supply chains, and preventing expenditures, risks and damages caused by forgery, piracy and embezzlement behaviors.

The article identification system illustrated here includes: (a) a physical article and/or article package representing goods and/or service manufactured and distributed by a genuine brand owner or an entrusting party or agent legally authorized thereof and sold to consumers; (b) security tracers, which include at least two different light energy response materials visible in spectrum UV and selectively within a near infrared spectroscopy; (c) the security tracers being applied on the article and/or article package, (i) the security tracers being provided in a widely popular general substrate including but not limited to polymer, surface coating, ink, paint and textile, (ii) the security tracers being directly applied on the article and/or article package in or after standard manufacturing and packaging processing, and (iii) the security tracers having a readable security label form which may be activated, captured and processed through a standard and general handheld mobile communication device; (d) the standard and general handheld mobile communication device (identification device) including (i) a user interface component such as a display screen and an audio loudspeaker; (ii) an image capture component, including a CMOS (or other type) camera lens subsystem and a controllable lighting mechanism such as a flasher; (iii) a processing capacity, including a programmable subsystem and a non-volatile memory; (iv) a mobile communication network/data transmission subsystem, including but not limited to a wireless link connected to the internet or a linked internet connection, which is capable of connecting the device to a central server; (v) a localization wireless communication subsystem, including a local wireless access point; (vi) a security subsystem, which can be initialized to use software and/or hardware resided on the identification device; and (vii) a geographical position perception capacity; (e) system software, including (i) a plurality of separate and linked databases which include authorized article identification and distribution data (Reference Data), system access and application data, captured information data and identification result data; (ii) sales and promotion data; (iii) identification processing software, and (iv) security software to protect the system software on the identification device and on a remotely positioned server, including protection when the identification device is communicated with the server for transmitting and/or receiving any system software and/or data; and (f) a remotely disposed server (central server) to provide the identification device with convenience for downloading and updating the system software.

The objects of the method illustrated here are to provide the consumers with an improved new and novel protection method for preventing risks, expenditures and damages caused by forgery, piracy and grey market behaviors, which can enable the consumers to finish verification thereof on the authenticity of the article; as a constituent for the purchasing decision of the consumers, the method can build the trust of the consumers on the protected brands, and build an excellent goodwill of the brand owners involved.

These objects of the method illustrated are achieved through the following advantages: (a) more diverse and safe article label processing based on visual and invisible security labels, these security labels including a plurality of security tracers in multiple forms applied to the target article and/or article package and these security tracers being applied on one or more raw material substrates used for producing the article and/or package; (b) practical, safe and mobile field identification processing, including user registration, system login for accessing and use as well as detection processing using one of multiple software techniques, the software techniques depending on the security tracers and the security label forms, including but not limited to frequency analysis and filtering, radioactive decay curve characterization and association as well as pattern or target character recognition, which is combined with (c) continuously supplying identification results, user behaviors and related reports which are encrypted and dynamically updated, as well as safe, accurate and valuable information of the system software update forms including system alarm and notification that can be exchanged between the consumers and the brand owners.

The method illustrated herein includes the following steps of: (a) labeling an article: by means of (i) combining a plurality of security tracers having energy response materials applied on one or more raw material substrates, the raw material substrates being used for producing a target article and/or article package; and (ii) applying the security tracers on the target article and/or article package in visible and invisible security label forms including but not limited to unique or not unique universal linearity and non linearity, shape, image, color, alphanum or digital code, sign or word, for marking and identifying articles manufactured, distributed and sold by a brand owner or a representative or transferee authorized thereof during the manufacturing or manufacturing post-processing of the article and/or article package and before being sold from an origin to an authorized stakeholder for distribution and sales; (b) performing user registration and system access: firstly (i) manually inputting personal registration information by a consumer and downloading system software from a central server to an identification device through an user interface mechanism, a mobile network, internet or wireless connection capacity of the identification device; and then (ii) activating a geographical position perception capacity of the identification device by the consumer to perform system access and primary identification operation, then selecting to continue the identification process, comprising selecting a brand and a name of a target article brand to be identified; (c) capturing an image: (i) lighting and motivating the security tracers applied in the security label through a flashing unit controlled by system software and flashing control as well as timing hardware of the identification device; and meanwhile or subsequently (ii) capturing a security label image through an image capture capacity of the identification device and storing the security label image in a memory of the identification device; (d) preprocessing and extracting characteristics to regulate or extract interested items in the captured image (captured information); (e) performing detection processing on the captured information: (i) using one software technique among multiple software techniques and depending on security tracers and security label forms to process the captured information, which includes but is not limited to frequency analysis and filtering, radioactive decay curve characterization and association as well as pattern or target article character recognition to generate a processing result; and (ii) matching the processing result with reference data items which are specially used to each article, stored in an encrypted local database and downloaded on the identification device, so as to generate a positive or negative matching result which functions as an identification result; and (f) performing identification postprocessing and dynamic update: (i) using the storage memory of the identification device and one or more user interface components (such as a display screen and/or audio loudspeaker) to encrypt and then locally store the identification result and display the result, so that the registered user can see or hear the identification result; (ii) encrypting and then locally storing user behaviors and related information for retrieving, analyzing and locally displaying the user behaviors and related information in future and dynamically updating the user behaviors and related information to the central server; and (iii) encrypting and then dynamically updating the system software, including system warnings and notifications received from the central server and stored on the identification device.

DETAILED DESCRIPTION OF THE PREFERRED EMBODIMENTS

The invention illustrated provides a new and novel article identification system, which enables consumers to easily, safely and reliably identify articles before purchasing and in points of sales through solving an adoption barrier and problems encountered by the consumers and brand owners, including system acceptability, costs, portability, ease of use and security.

Figure 1:
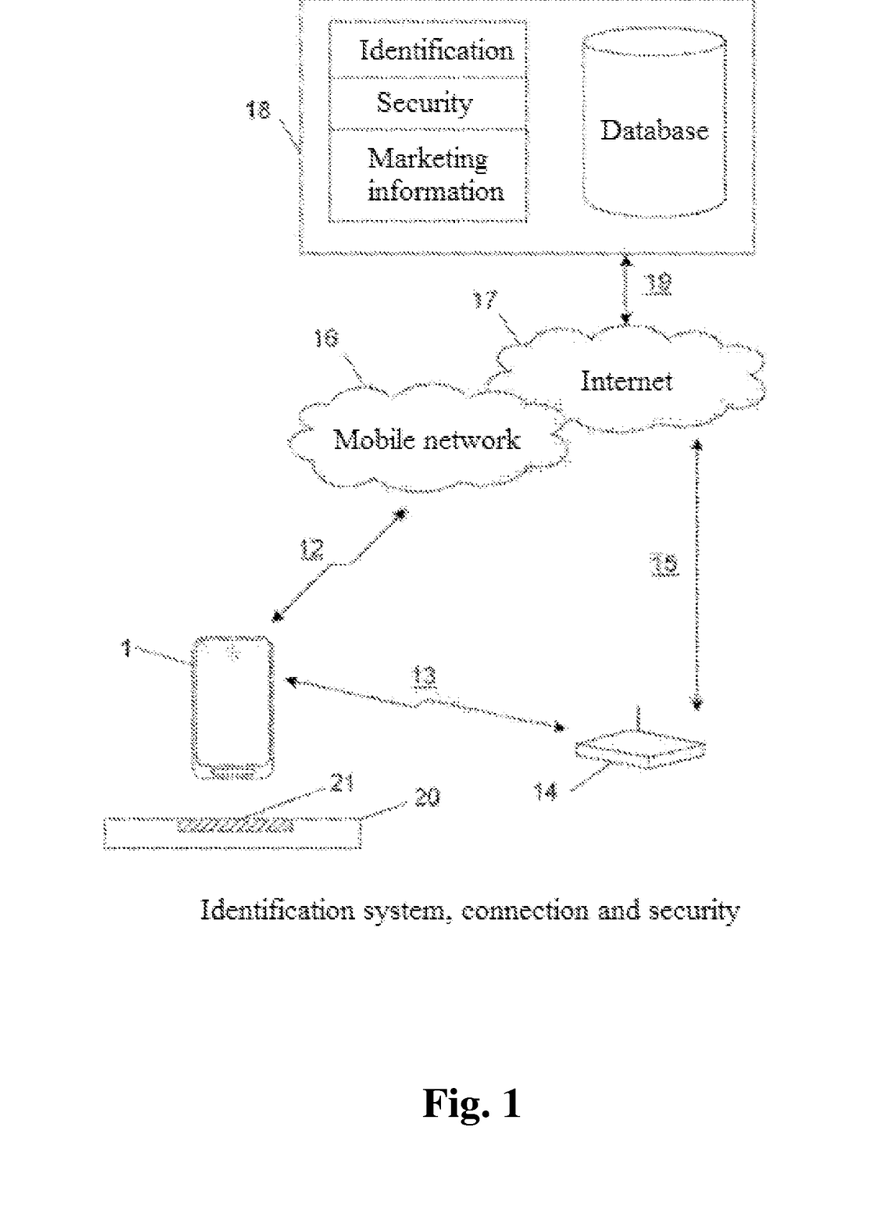
FIG. 1—identification system, connectivity and security, showing a block diagram of system components, which includes the security and connectivity between an identification device and a central server.
Figure 2:
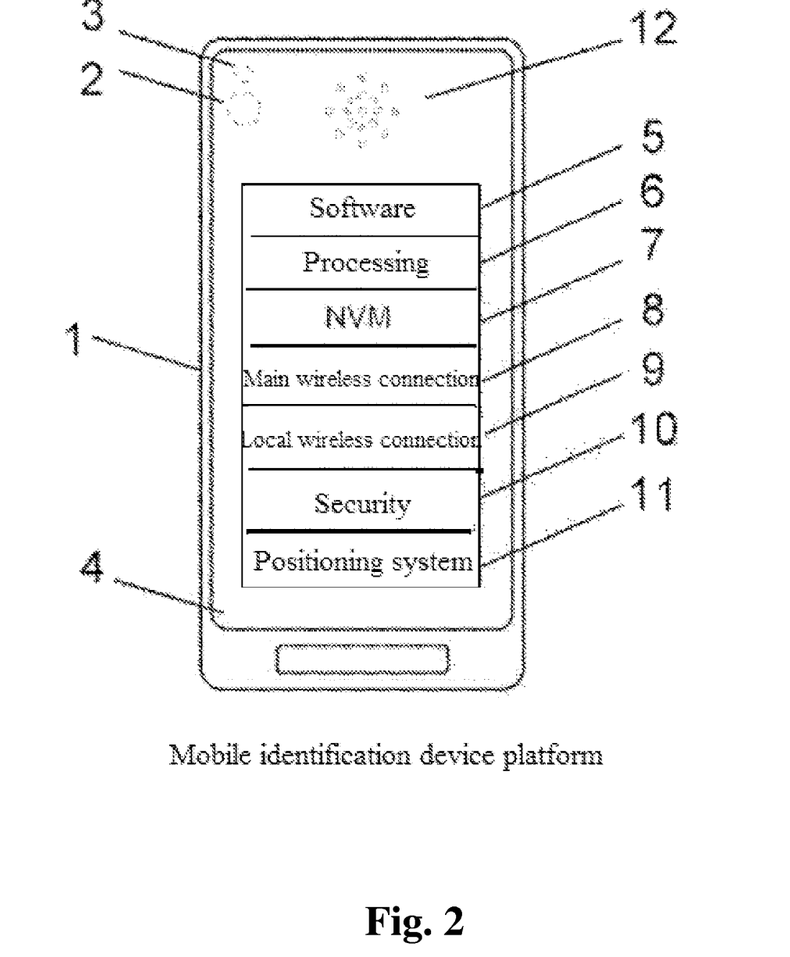
FIG. 2—mobile identification device platform, showing a block diagram of one embodiment of the identification device, which is a mobile communication device having an image capture capacity and other special components.

As shown in FIG. 1 and FIG. 2, the article identification system includes (a) a physical article and/or article package (item 20 in FIG. 1) representing goods and/or service manufactured and distributed by a genuine brand owner or an entrusting party or agent legally authorized thereof and sold to consumers; (b) security tracers, which include at least two different light energy response materials (see item 21 in FIG. 1) visible spectrum in UV and selectively within a near infrared spectroscopy; (c) the security tracers being applied on the article and/or article package, (i) the security tracers being provided in a widely popular general substrate including but not limited to polymer, surface coating, ink, paint and textile through compounding, premixing or other manners, (ii) the security tracers being directly applied on the article and/or article package in or after existing or standard manufacturing and packaging processing, and (iii) the security tracers being performed in a readable security labeling form activated, captured and processed through a standard and general handheld mobile communication device (the above (b) and (c) are combined and described as item 21 in FIG. 1); (d) the standard and general handheld mobile communication device (identification device) (item 1 in FIG. 1) including (i) a user interface component such as a display screen (item 4 in FIG. 2) and an audio loudspeaker (item 12 in FIG. 2); (ii) an image capture component, including a CMOS (complementary metal oxide semiconductor) camera lens or other type camera lens subsystem (item 2 in FIG. 2), and a controllable lighting mechanism such as to a flasher (item 3 in FIG. 2); (iii) a processing capacity, including a programmable subsystem (item 6 in FIG. 2) and a non-volatile memory (item 7 in FIG. 2); (iv) a mobile communication network/data transmission subsystem, including but not limited to a wireless linkage connected to the internet (item 12 in FIG. 1 and item 8 in FIG. 2), which is capable of connecting the device to a central server (item 18 in FIG. 1); (v) a localization wireless communication subsystem, including a local wireless access point (item 14 in FIG. 1 and item 9 in FIG. 2); (vi) a security subsystem, which can be initialized to use software and/or hardware resided on the identification device; and (vii) a geographical position perception capacity (item 11 in FIG. 2); (e) system software (component element of item 18 in FIG. 1), including (i) a plurality of separate and linked databases which include authorized article identification and distribution data (Reference Data), system access and application data, captured information data and identification result data; (ii) sales and promotion data; (iii) identification processing software, and (iv) security software to ensure the security of the system software on the identification device and on a remotely positioned server, including the security when the identification device is communicated with the server for transmitting and/or receiving any system software and/or data; and (f) a remotely disposed server (central server) (item 18 in FIG. 1) to provide the device with convenience for identifying as well as downloading and updating the system software, so that daily consumers are capable of easily, safely and flexibly verifying and identifying the genuine among unqualified, illegally produced and/or packed articles and illegally sold articles as well as related article and supply information before purchasing related articles, and/or when purchasing the related articles and/or after purchasing the related articles.

FIG. 1 represents two potential connection mechanisms between an identification device 1 and a central server 18 in a diagrammatic form. According to an embodiment highlighted in FIG. 1, the first of these connections may be formed by a manner of a wireless data network 16 of a wireless link 12 and an internet 17 and a server 18 finally using a connection 19.

In another embodiment described in FIG. 1, equivalent connection may be formed via local low-power wireless (item 9 in FIG. 2) in a communication device, and using a wireless connection 13 through a local wireless access point 14, the internet 17 (via a connection 15) and the server connection 19.

The main significance of the system according to the present invention lies in the availability of actual data link, rather than a specific implementation technique, which may possibly be evolved or changed as time goes on.

The main function of the central server 18 is to provide conveniences for identification device 1, user registration, identification and system access, system software downloading and updating as well as obtaining of workable (i) user access information; (ii) downloading related identification database to the identification device for offline/localized article identification; and (iii) marketing information.

In FIG. 1, the system software stored on the central server 18 includes: (i) a plurality of separate and linked databases which include authorized article identification and distribution data (Reference Data), system access and application data, captured information data and identification result data, and are together described as "database" in FIG. 1; (ii) sales data; (iii) identification processing software; and (iv) security software to ensure the security of the system software on the identification device 1 and on the central server 18, including the security when the identification device is communicated with the server for transmitting and/or receiving any system software and/or data.

Figure 4:
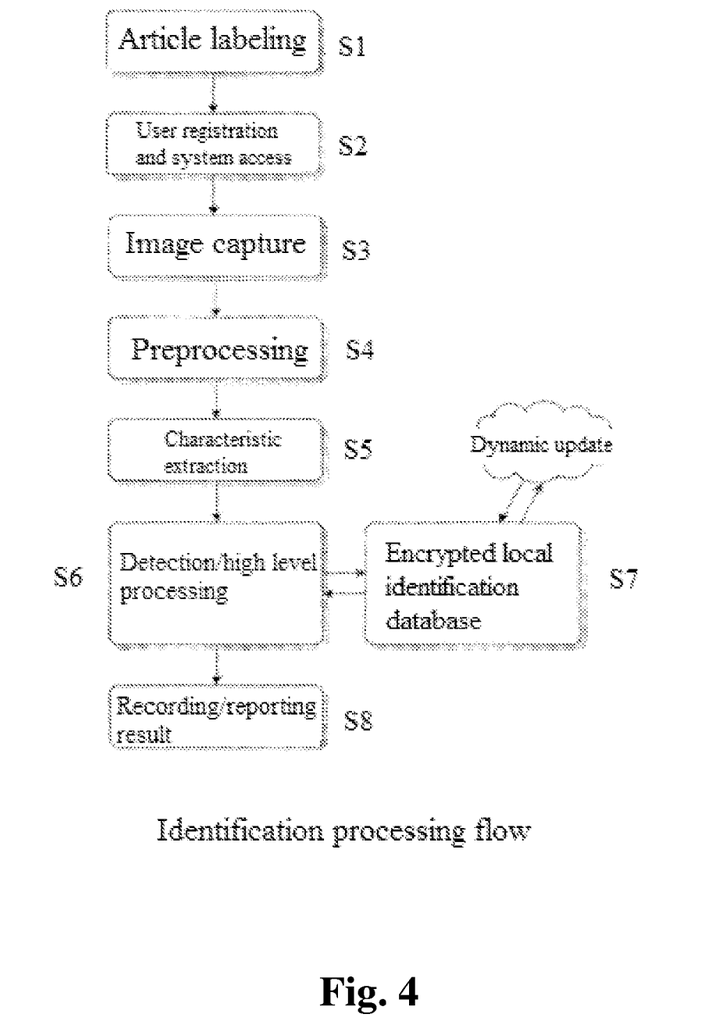
FIG. 4—identification processing flow, showing key processing of the present invention from labeling the article to identification postprocessing including reporting and recording results and dynamically updating.

It should be particularly noted that the local identification database stored in the identification device 1 and described as encrypted local identification database (step S7) in FIG. 4, and the software components on the identification device and described as software (item 5) in FIG. 2 are considered as dynamic components. With new or updated identification databases become workable, the component S7 in FIG. 4 is accordingly upgraded through the described security data connection. The security data connection is initialized through a server notification to the identification device, an automatic/periodic identification device request to the central server, or via an initialized user primary manual request of the identification device 1 in FIG. 1.

The encrypted local identification database (S7 in FIG. 4) on the identification device is preferably encrypted during "being idle" and during transmission, so as to prevent unauthorized access, operation, control and forgery. This encryption should be preferably performed by using the methods that have been adopted and proved in the known industry of those skilled in the art in any specific point in time. Although no specific encryption methods (the system requires effective prevent access, as described above) are stipulated, the normal techniques used for data storage encryption at current relate to application of symmetrical encryption having a block cipher form and at least using a 128-bit key length. The function of this type can be performed simply through the software, hardware (such as hardware encryption engine) in the identification device 1, or performed through using an additional peripheral encryption device (such as a smart encryption card).

Excluding the above descriptions, for example, separate storage of encrypted data and keys, monitoring and recording on secret key access, strict user identification and end-to-end data encryption all belong to basic security concepts, which is required by all the reasonable embodiments in current invention.

FIG. 2 represents an embodiment used for a mobile platform required by the identification device, including configuration of a processing component of the existing invention. The embodiment is a mobile communication device. This figure showing the existing mobile communication device (item 1), which includes a user interface component such as a LCD (or other type) screen (item 4) and an audio loudspeaker (item 12) for the device to conveniently operate different mechanisms of the function. These mechanisms include a required image capture component which includes a required CMOS (or other type) camera lens subsystem of a required optical device (item 2), and a controllable lighting mechanism such as a flash device (item 3). The specific characteristics of the camera lens or flash component of the mobile device are stipulated, which requires 3 to be capable of sufficiently lighting so as to evocate responses required during identification query and from the target article; moreover, the camera lens 2 can capture images including the data related to the identification processing with enough resolution and speed.

In addition to these components, the identification device provides additional communication and processing capacity, and includes a programmable processor subsystem (item 6), a non-volatile memory (item 7), a mobile communication network/data transmission subsystem (item 8) and a local wireless communication subsystem (item 9).

The item 8 and the item 9 can be explained as presently useable techniques, wherein one embodiment is IEEE802.11 and another embodiment is IEEE802.15 of item 9. However, there is no stipulation that the specific technique that enables the identification device to meet the communication requirements of the system and is used for the item 8 and item 9 is just the applicable data connection between the wireless data network or localization wireless system and an external security server; and one embodiment is an IEEE802.11 router shown by item 14 in FIG. 1. Either the communication techniques that are general in any special moment or frequently used in the handheld mobile communication device can be employed in the present invention.

To prevent unauthorized interception or interference on a communication channel established using the item 8 or 9, it is necessary that the identification device also provides a security subsystem 10, which can be used, for example software, hardware or combination technique, to embody according to the situations.

In addition to the foregoing descriptions, the geographical position perception during the operating process of the device has advantages, which enables the system to independently and automatically capture the identified position, solve the encountered problems about the accuracy of the system data, and easily and accurately identify where the consumers find forged and embezzled article. The system has additional advantages of being capable of independently identifying an identification result site, while any potential system damage or situation and opportunity for the consumer, sales agent or distributer of the article identified to report corruption phenomenon will not appear. The function of the system is marked by item 11 in FIG. 2.

In another embodiment of the system described in FIG. 2, a site perception function 11 is realized by using a hardware subsystem that enables a global positioning system (GPS) with reference to positions provided by local wireless subsystems such as IEEE802.11 which are known to those skilled in the art. Similarly, the technique which can be used in given point in time on the existing mobile device can describe preferred mechanisms, and the position perception thereof is only the system demand under the current background of the present invention.

All the operations (including wireless connection, local/offline identification processing, flash and camera flash control, image capture and identification, and the like) in the mobile communications based on the identification device 1 will need to be performed under the control of customized system software, for example, as described by item 5 in FIG. 2, which form the base components of the present invention. For the consumers, the system characteristic has the advantages of not requiring any additional external linkage or connection, complicated and high cost identification device or device component to perform the identification operation, thus solving the similar problems encountered by brand owners and daily consumers: deployment of a commonly used and portable system being easily and affordably accepted by consumers crossing borders and regions in a mass market scale.

FIG. 2 shows an embodiment of the mobile identification device mentioned above and having these highlighted components and characteristics. The mobile communication device, such as a smart phone, PDA and tablet device, has been commonly used by consumers. Thus consumers are very familiar with the use of the device, and do not need to receive any user training to use the identification device. The system using the standard and global-used device has the additional advantages that the system also enables the brand owners, authorized supply chains and consumers to cope with the challenges of forgery, piracy and embezzlement behaviors caused by globalization of manufacturing and distribution of consumer goods and package thereof more easily, thus selling the consumer-based article and package from the origin thereof crossing the borders or regions.

To provide a simple and easy-to-use article identification system to consumers, the system has to break the adoption barrier of the consumers in the mass market, such as availability, cost, transportability and ease of use, which is realized through the described identification device of the system. The identification device of the system includes a standard and general mobile communication device which includes (i) a user interface component such as a display screen and an audio loudspeaker; (ii) an image capture component, including a CMOS (or other type) camera lens subsystem and a controllable lighting mechanism such as a flasher; (iii) a processing capacity, comprising a programmable subsystem and a non-volatile memory; (iv) a mobile communication network/data transmission subsystem, including but not limited to: a wireless link connected to the internet or a linked internet connection, which is capable of connecting the device to a server; (v) a localization wireless communication subsystem, including a local wireless access point; (vi) a security subsystem, which can be initialized by software and/or hardware resided on the identification device; and (vii) a geographical position perception capacity. The mobile communication device having these components and characteristics have been generally used by the consumers in a form of a standard and general mobile phone, which provides the consumers with an advantage of accessing and using the system without obtaining any additional identification device or device component. The users are thus familiar with the use of the device, and can easily use the identification device without receiving any user training to use the identification device. The system using the standard and global-used device has the additional advantages that the system also enables the brand owners, authorized supply chains and consumers to cope with the challenges of forgery, piracy and embezzlement behaviors caused by globalization of manufacturing and distribution of consumer goods and package thereof more easily, thus selling the consumer-based article and package from the origin thereof crossing the borders or regions.

Figure 3:
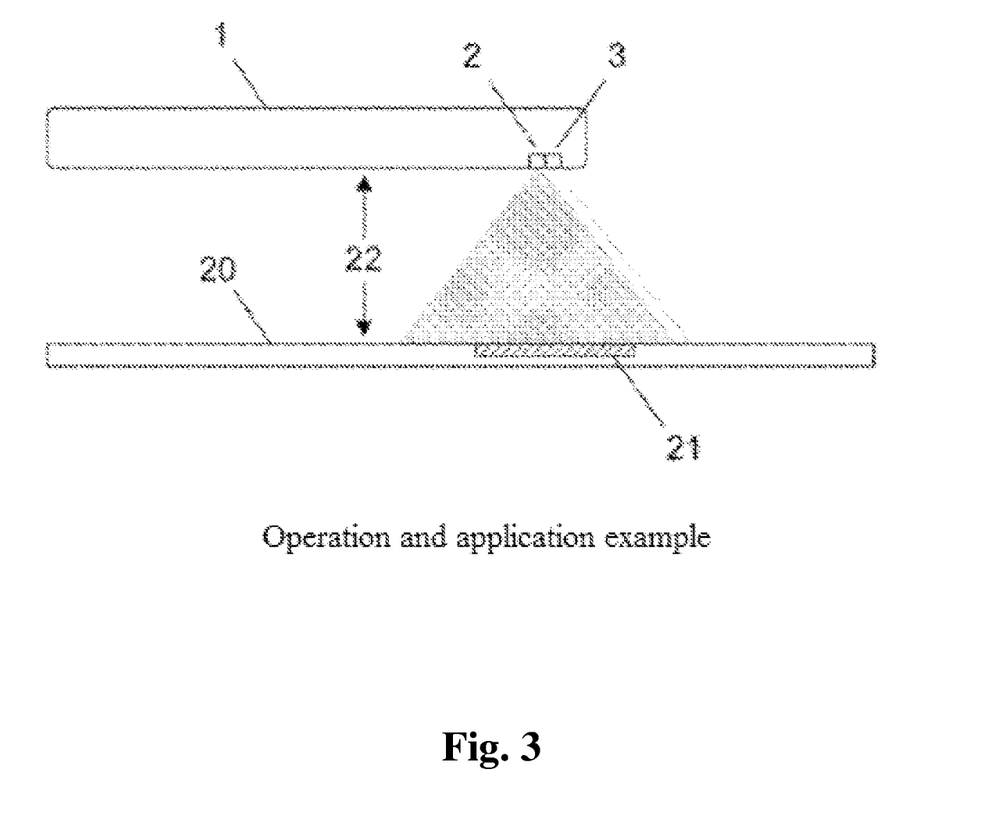
FIG. 3—operation and using situation, showing an article and a security label component of a system as well a block diagram of performing image capture processing through activating a flash and a camera lens component of the identification device.

FIG. 3 describes basic using situation of the present invention, showing an article and a security label component of a system. An article, surface or material 20 requiring identification is provided with a security label 21 which is embedded thereinto, printed thereon, attached or connected thereon and includes at least two security tracers compounded in raw material substrates.

Identification processing software resided on the identification device may include any one or more item detection, capture and analysis techniques, including but not limited to: frequency analysis and filtering, radioactive decay curve characterization and error correction as well as pattern and object recognition.

The security label includes at least two security tracers, which include different light energy response materials visible spectrum in UV (A) and selectively within a near infrared spectroscopy (315 nm-1500 nm), and at least one of the security tracers is invisible to an unaided human eye. These tracers are provided on widely popular substrates (such as polymer, surface coating, ink and textile) through compounding, premixing or other manners and used by brand owners for manufacturing and/or packaging articles thereof, so that the brand owner is capable of applying the security label in the existing or standard manufacturing and packaging processing.

Therefore, the security label includes multi-layer security to solve the problem of protecting and identifying the genuine from forgery, piracy and embezzlement behaviors encountered by the consumers and the brand owners. The first layer includes a security tracer combination which includes at least one material invisible to an unaided human eye, including but not limited to neodymium or europium doped aluminosilicate, oxysulfide, oxychloride and oxyfluoride, and solves the problem encountered by employing a visible and easy-to duplicate apparent or visual technique. The second layer includes various applications which enable the security label to be easily applied on daily consumer goods and/or package thereof of all forms without damaging. The illustrated application diversity also solves the problem encountered by only employing a printing technique because the security label may be embedded onto the entire article and/or package thereof, and eliminates the probability that a personator falsifies or removes the label. Therefore, the security label may become a part of the article and/or article package, or may be printed or attached on the article and/or article package in a visible, concealed and/or masking form.

One such an embodiment is a tracer to be compounded to a frequently-used polymer such as PET (polyethylene glycol terephthalate), which is manufactured by a brand owner by using an injection molding device and used for cap and container of fast moving consumer goods. The third inherent security layer includes diverse labels, which may include physical characteristics such as the electromagnetic attribute of the tracer or logic characteristics such as sign, alphameric code and bar-code.

Therefore, the multiformity of the security label applications enables the security label either to be partially used in a specific region of the article component and/or package thereof or be applied throughout one or more complete components or selectivity applied on all the components.

When the security subsystem (item 10 in FIG. 2) on the identification device is combined with the security software component of the system software, the security label reflects the new, novel and safer forms of the article label of the brand owner to withstand attacks of forgery and embezzlement. Meanwhile, the system component enables the consumers to identify the article more safely at any place and any time including prior purchasing and at points of sales.

When being combined with the local identification processing capacity and connectivity characteristic of the identification device, the security component provides the consumers with a system that can reliably identify the article through continuously and dynamically updated system software and local processing, without depending on interconnection or external device.

Another advantage of the system lies in advanced system security component, which includes (i) a security subsystem on the identification device; (ii) security software to protect the security of the security software on the identification device and on a remotely positioned server, including the security when the identification device is communicated with the server for transmitting and/or receiving any system software and/or data; and (iii) security tracers providing inherent security, which at least include two different light energy response materials visible spectrum in UV and selectively within a near infrared spectroscopy, and are directly applied on the article and/or article package. These system components enable the consumers to identify the article more safely at any place and any time including prior purchasing and at points of sales. When being combined with the local identification processing capacity and connectivity characteristic of the identification device, the security component provides the consumers with the system that can reliably identify the article through continuously and dynamically updated system software and local processing, without depending on interconnection or external device.

The illustrated invention provides a new and novel method of an article identification, which can better protect the consumers and brand owners for withstanding risks, expenditures and losses caused by article counterfeit, piracy and grey market behaviors through enabling the consumers to finish verification thereof on the authenticity of the article as a constituent for the purchasing decision thereof. The method builds the trust of the consumers on the protected brands, and builds an excellent goodwill of the brand owners involved. The object of the illustrated method is achieved through the following advantages, namely: (a) more diverse and safe article label processing based on visible and invisible security labels, these security labels including a plurality of security tracers in wide forms applied to a target article and/or article package and these security tracers being applied on one or more raw material substrates used for producing the article and/or package; (b) practical, safe and mobile field identification processing, including user registration, system login for accessing and use as well as detection processing using one of multiple software techniques, the software techniques depending on the security tracers and the security label forms, including but not limited to frequency analysis and filtering, radioactive decay curve characterization and error correction as well as pattern and object recognition, which is combined with (c) continuously supplying safe, accurate and valuable information, being capable of exchanging encrypted and dynamically updated identification result forms, user behaviors and related reports as well as system software update including system alarm and notification between the consumers and the brand owners.

As shown in FIG. 4, the illustrated invention includes the following steps of: (a) labeling an article (step 1 or S1 in FIG. 4), by means of (i) combining a plurality of security tracers which are energy response materials applied on one or more raw material substrates and used for producing a target article and/or article package; and (ii) applying the security tracers on the target article and/or article package in visible and invisible security label forms, these security labels including but not limited to unique or not unique universal linearity and non linearity, shape, image, color, alphanum or digital code, sign or word, for marking and identifying articles manufactured, distributed and sold by a brand owner or a representative or transferee authorized thereof during the manufacturing or manufacturing post-processing of the article and/or article package and before being sold from an origin of product to an authorized stakeholder for distribution and sales; (b) performing user registration and system access (step 2 or S2 in FIG. 4): firstly (i) manually inputting personal registration information by a consumer and downloading system software from a central server to an identification device through an user interface mechanism, a mobile network, internet or wireless connection capacity of the identification device; and then (ii) activating a geographical position perception capacity of the identification device by the consumer, then selecting to continue the identification process, including selecting a brand and a name of a target article brand to be identified to access the system and initialize the identification operation; (c) capturing an image (step 3/S3 in FIG. 4): (i) lighting and motivating the security tracers applied in the security label through a flashing unit controlled by system software and flashing control as well as timing hardware of the identification device; and meanwhile or subsequently (ii) capturing a security label image through an image capture capacity of the identification device and storing the security label image in a memory of the identification device; (d) preprocessing (step 4 or S4 in FIG. 4) and extracting characteristics (step 5 or S5 in FIG. 4) to regulate or extract interested items in the captured image (captured information); (e) performing detection/advanced processing on the captured information (step 6 or S6) in FIG. 4): (i) using one software technique among multiple software techniques and depending on the security tracers and the security label forms to process the captured information, including but not limited to: frequency analysis and filtering, radioactive decay curve characterization and association as well as pattern or target article character recognition to generate a processing result; Designated (ii) matching the processing result with reference data items which are specially used to each article and stored in an encrypted local database that is downloaded on the identification device, so as to generate a positive or negative matching result which functions as an identification result; and (f) performing identification postprocessing (recording/reporting the result) (step 8 or S8 in FIG. 4) and dynamic update (step 7 or S7 in FIG. 4): (i) using the storage memory of the identification device and one or more user interface components such as a display screen and/or audio loudspeaker to encrypt and then locally store the identification result and display the result, so that the registered user can see or hear the identification result; (ii) encrypting and then locally storing user behaviors and related information for retrieving, analyzing and locally displaying the user behaviors and related information in future and dynamically updating the user behaviors and related information to the central server; and (iii) encrypting and then dynamically updating the system software, including system warnings and notifications received from the central server and stored on the identification device.

The illustrated processing of labeling an article has the advantages of ease of use, no destructiveness and multiformity in application, which solves the problem that a high security level technique usually requires an additional, complicated and high cost manufacturing or packaging processing identification technique. Security tracer materials may be applied through a wide range of article manufacturing and package processing; these processing include but is not limited to: injection molding, blow molding, laminating, surface coating, yarn weaving and fiber weaving as well as a wide range of standard commercial printing methods which include silk screen printing, offset printing and flexographic printing, so that the system according to the present invention can be realized by the brand owners and supply chains authorized thereof, and accepted by the consumers, for identifying and tracing common daily articles and/or packages thereof.

According to the method of the present invention, the security label includes a combination of visible and invisible labels which have unique or not unique general image, color, shape, alphameric code and/or digital code, sign and word forms, to verify the authenticity of article manufacturing and authorized article sales.

The article identifying information having different forms is generated by the brand owner and/or representative authorized thereof, or through an alternative manner of system generation, which includes new or existing forms, usually can be obtained or created into a database, and stored on the central server. The article identifying information when being distributed to an article identification element and after being authorized by the brand owner is classified into reference data. The flexibility of the article identification formats overcomes the common problem encountered by the existing identification techniques which limit the brand owners as article label fields having the same format, so that the described invention are more easily and more practically realized to the brand owners of different types of consumer goods.

The following presents the initialization steps for labeling the article and storing other related data into the central server (item 18 in FIG. 1). The user registration and system access step have been finished yet. According to the illustrated method, if the reference data exists in the encrypted local identification database, then the identification processing can be only activated and performed locally by registered and identified consumers through using the identification device (S7 in FIG. 4).

Before locally downloading/installing the software system on the identification device, the consumers input the required user registration and identification information through using the user interface function of the identification device, wherein the user registration and identification information includes personal information, which may be possibly changed from time to time, including but not limited to: the name and email address of the consumer; the interconnection function and security protocol of the device are used, the access data of the existing user is received and queried by the central server, and then the user becomes a new user through identification, recording and registration, and a user access database is updated.

The illustrated installing above includes installing the encrypted local identification database. After finishing the registration and local installation processing, the user may be continuously accessed to the system through firstly selecting the target brand and article which are expected to be identified by the consumers. Supposing the reference data to the target brand and article exists, the identification operation is continued to perform image capture processing, which is as described by item 23 in FIG. 4. It should be noted that before continuously performing the image capture step, the system may request, remind or invite the user to activate the geographical position perception component of the identification device, which has additional advantages for distribution/sales information based on any position and related to the target brand and article interested by the brand owner and/or consumer, and particularly for the consumers that are at authorized sites for selling the target brand and article and systematically and independently identifying the article embezzlement behaviors prior to purchasing and at the points of sales.

The identification device may receive system notification, alarm, marketing information and user information from time to time before and/or after performing the identification operation. Particularly, the system may notify the consumers of specific security marketing information, including the position of the security label of the target article. An embodiment of this notification includes notifying interior and external security labels of the target article and article package thereof, which may be possibly needed by the brand owners according to different situations, so as to preventing from containing illegal, unqualified or illegally distributed articles in the genuine packages and selling the illegal, unqualified or illegally distributed articles to the consumers. In another embodiment, for a business purpose, the brand owner assigns a plurality of single article or article ethnic groups using single article identifying information to a total package (larger bulk packages or a plurality of item packages). The information is notified to the consumers before the image capture step is continuously performed.

Opposite to the currently advanced identification technique and prior invention, it is intended to provide high-value-added information to the consumers and brand owners continuously, so that the information profit and value of all the stakeholders participated in the identification system are maximized on the basis of automatic system generation and in accordance with requirements, which has additional advantages of providing the consumers with more valuable information generated by an isolated system and the brand owners besides the identification result, improves the consciousness of the consumers on the identification result and behaviors and particularly on the results and behaviors on the article category and purchasing places, is beneficial for building the trust of the consumers on the protected brands and authorized sales channels thereof for selling the projected articles of the projected brands, and building an excellent goodwill of the brand owners involved. For example, the consumers may benefit from quantitative and qualitative data. These data includes negative result notifications about the negative result and statistical data of the articles favored by the consumers, most frequently-used article identification, latest article purchasing, identified uppermost brands and articles with positive identification results, purchasing places, most frequently-used places, and the like. Moreover, the brand owners may benefit from the notification generated by the system as well as report and identification result about the user behaviors, and independent tools used for quick and low-cost field notification and monitoring forgery, piracy and embezzlement behaviors. The exchange of this new and novel value added information is beneficial for all the stakeholders participated to better protect themselves, and reducing the costs, risks and damages caused by forgery, piracy and transfer behaviors.

FIG. 3 shows primary processing of labeling an article and capturing an image according to the application method of the present invention through an identification device 1 separate from a security label item 21 applied to an article or package thereof. The separate distance is distance 22. Timing, intensity and modulation characteristics suitable for the environment (software that can operate on the identification device) and the excitation characteristic of the security tracer item 21 are used, and a flashing unit 3 in the identification device 1 is activated. This flashing control is provided by system software (item 5 in FIG. 2) forming a part of the present invention and in combination with useable flashing control and timing hardware in the identification device.

In the case of passively visible security labels having visible logic forms such as bar-code or other visible and non-radioactive patterns or signs, the operation of the flasher will be used simultaneously when performing image capture from a camera lens 2 of the identification device.

In the case of initiative/radioactive invisible security tracers, the operation of the flasher may be simultaneously adopted according to the excitation characteristics of the security tracers when performing image capture from the camera lens 2 of the identification device, or may be adopted after an excitation event (flashing), so as to capture the physical characteristics of materials, including but not limited to the energy change color of the excitation materials, decay characteristic of the materials after the excitation, other software and camera lens readable energy response excitation characteristics or characteristics combining two or more physical characteristics or physical and logical characteristics. A plurality of flashing events or image capture may be possibly needed for correctly lighting and/or exciting and capturing all the related characteristics of the security labels according to query.

Irrespective of physical characteristics and/or any logic form (such as invisible bar-code printed by transparent paint including invisible security tracer), a method for acquiring an image of a security label including invisible and excited security tracer relates to activating the flash at moment (Fa1) so as to play the role of the light energy sources required for activating the physical characteristics of the security tracers included in the security label. Then the flash is deactivated at moment (Fd1) before activating the camera lens at moment (Ca1), and then the camera lens (Cd1) is deactivated when identification software tries to capture security tracers existing in different readable forms. The pair appearance of the activation and deactivation are pre-configuration so as to comply with the excitation and light energy absorption properties of the security tracer materials that are readable to the camera lens of the illustrated form.

Figure 5:
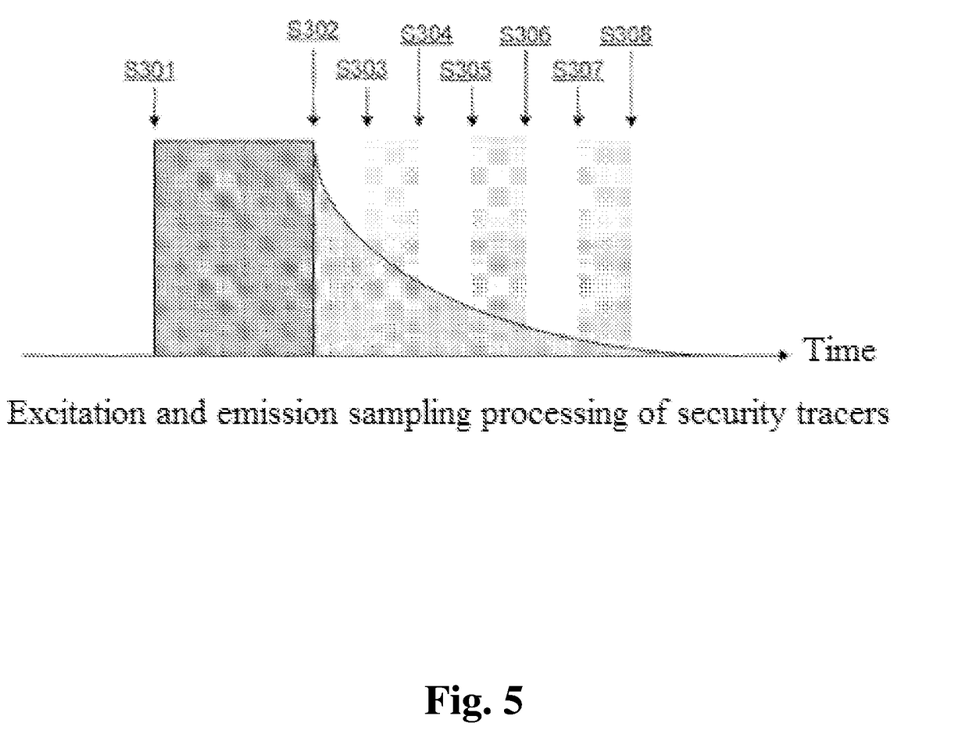
FIG. 5—excitation and emission sampling processing of security tracers, showing a block diagram of excitation and emission sampling processing on invisible and emitted security tracers which include security labels; and the processing the radioactive decay curve characterization of the security tracer is an embodiment for image capture (step 3/S3) in the identification processing flow (FIG. 4)

FIG. 5 shows total excitation and sampling handle for making a security label, wherein the security label includes invisible and excited security tracers. It should be noted that this figure does not stipulate whether the excitation phenomenon (started at moment S302 in FIG. 5) of the tracer should appear in UV, visible or IR part in an electromagnetic spectroscopy after the excitation. This behavior will be determined through a specific property of the security tracer.

At the moment S302 (Tan in FIG. 5, a flash of a mobile device (item 3 in FIG. 2) is activated under the control of low level software, and terminated at the moment S302 ('Fd1') in FIG. 5. During this period, the flash may be affected by the intentional modulation, intensity or other control of the system software determined by taking consideration of the requirements of the security tracer materials.

Although single excitation period is described in FIG. 5, it may relate to a plurality of flashing activation or user-defined intensity modulation curves, and aim at only reflecting excitation sequences applicable to the security tracers under examination.

At moment S303 (Van, the image capture of a camera lens of the mobile device is initialized under the control of the low level system software. The period from S302 to S303 (Fd1 to Ca1) will be determined by the security tracer according to the examination, but is usually on an order of magnitudes of hundreds and thousands of microseconds. At the moment S304 ('Cd1'), the image capture performed by the camera lens of the mobile device has been finished, and the image is stored in a system memory for capture post-processing.

The point in time from S305 to S306 and the point in time from S307 to S308 reflect subsequent image capture ('CaN-CdN') controlled and activated by the system software. These information provided by subsequent capture may be served as the time decay characteristic of the tested security tracer after being excited. This facility may compare the detected characteristics and decay characteristic with the foregoing recorded characterization responses.

An embodiment of the security label includes europium doped oxysulfide fluorescer premixed with transparent paint, which is used as a security tracer A for invisibly printing alphameric code and is disposed beside another 20 mm*20 mm invisible coating print patch which is served as a security tracer B and similarly uses paint containing europium doped aluminum-silicon article. The security tracer A is excited by the flash of the identification device by 370 nm intensity and light source, while the security tracer B is similarly excited by 350 nm-500 nm intensity and light source. Both the security tracers A and B absorb the light emitted by the flash and produce visible light emitted by 625 nm intensity. The visible absorption of the security tracer A' obtains the UV fluorescence image of the alphameric code, which can be captured by the camera lens of the identification device and processed. The security tracer B emits visible red, which is throughout the surface region of the print patch, and may also be captured by the camera lens of the device. When the security tracers are combined by the processing software of the device, the two invisible printing materials are converted into UV fluorescent alphameric code and adjacent red print patch. The identification software of the identification device is used for verifying the alphameric code and the colored patch according to the encrypted local identification database resided on the identification device, so as to produce the identification result displayed by the method illustrated herein. Other visible and invisible materials may also be used for the security tracers, including but not limited to: up-converting phosphor, down converting phosphor, inorganic complexes emitting pair characteristics through overlapped/parallel excitation, materials that can be identified through frequency spectrum and other materials known to those skilled in the art. It should be noted that the materials of the security tracer are not restrictively stipulated according to the invention described, but basic requirements are provided only, that is, the security label includes at least two security tracers, at least one of which includes an invisible material to an unaided human eye before performing the identification operation through the device when being applied on the articles and/or packages thereof, and the at least one material can be captured and processed by the system software of the device as described herein.

In various mediums including ink or polymer, the concentration of the security tracer is very low, and usually ranges from 0.005% to 10% when being expressed by the weight percentage of the finished article or package component applying the security label. For example, in another embodiment of the security label, when being applied on a product or label coating form requiring a coating density of 15 GSM, 50% of the surface area of the security label having a total surface area of 2 cm*2 cm is coated by a coating carrying the security tracer A, while the other 50% is coated by a coating carrying the security tracer B. The security tracer B has a required 0.5% concentration level of a security tracer that can be used for reading and identifying the coating. Each protected article totally needs 0.03 mg security tracer (0.015 mg security tracer 1 covers 1 $cm^2$), while 0.015 mg security tracer 2 covers another 1 $cm^2$). Every 0.15 mg security tracer is premixed or compounded with the coating material, causing that the security coating of each protected article includes 0.03 mg security tracer and 2.97 mg coating material, which means that when being mixed with a coating carrier and applied as a security label, the coating of 1 kg security tracer 1 and 1 kg security tracer 2 can supply 66,666,666 single articles. With such multiformity, expansibility and ease of use, the present invention solves unrealistic and high cost problems involved in labeling an article as well as the implementation problem of association with the existing identification technique.

In any case, the captured image/information is processed through software operated on the identification device and compared with the identification data (Reference Data) from the local encrypted database (previously downloaded from the central server (item 18 in FIG. 1)), and an identification result is transmitted; and the identification result having positive or negative 'matching' form is provided to the user through the useable user interface component (such as screen and audio loudspeaker (respectively 4 and 12 in FIG. 2)) of the identification device.

FIG. 4 shows a general processing flow of the illustrated method from image capture to identification postprocessing and dynamic update, including user access and identification result reports. The image capture (step 1 or S1 in FIG. 4) reflects an embodiment of a combination step decomposed in FIG. 3, which relates to operations to the flash and the camera lens of the mobile device, so as to capture useable images from an article according to identification query. These images are captured into the system memory for processing and identifying.

Preprocessing (step 4 or S4 in FIG. 4) usually regulates the captured image so as to ensure that the images have applicable formats to subsequent processing steps. The operation may relate to scaling, noise reduction, contrast enhancement, digital filtering and various other processing depending on the properties of security items that are being identified.

Characteristic extraction (step 5 or S5 in FIG. 4) shows the processing of extracting interested article identification items from the captured images. In a plurality of embodiments of these characteristics, edges, corners, blobs and ridge portions (or other interested items, depending on the structure of the security item that is being identified) are extracted from the captured images for detection processing.

Detection/high level processing (step 6 or S6 in FIG. 4) shows actual field identification on the captured security item according to the data from the local and dynamically updated identification database (step 7 or S7 in FIG. 4). The processing may be performed by using one of multiple software techniques, which depends on the discussed security item, wherein the embodiment thereof includes: using various transformed or suitable methods (such as software neural network techniques) to perform frequency analysis and filtering, radioactive decay curve characterization and error correction as well as pattern and object recognition operations and various analysis of other types.

The reference data of the security item of each type that can be used for specific identification device/user is stored in the encrypted local database (step 7 or S7 in FIG. 4). It should be noted that all the related data can be offline used without server interaction-mobile identification device during the identification processing period. Therefore, a security updating method is needed so as to maintain the circulation of the database.

A recording/reporting result frame (step 8 or S8 in FIG. 4) shows postprocessing behaviors of the identification device. These behaviors include user alarm/notification via the screen (item 4 in FIG. 2) of the identification device 1, and/or audio tune or message having pre-recorded or synthetic speech formats via the built-in loudspeaker (item 12 in FIG. 2) of the identification device, which potentially support multiple languages. Moreover, the recording/reporting processing may relate to recording the result in a safe and encrypted log file for later retrieval and analysis, and transmitting related data to the central server through a manner of real time or delay bulk uploading. The related data in the context may include the following items: such as article database identification code, detection/identification processing time, date and method, geographical position, pass/failed standard and related identification result data, and un-processed and/or pre-processed images. The recording, retrieval and reporting capacity and processing provide a new and novel manner for the brand owners and consumers so as to accurately and timely notify events of forgery, piracy and embezzlement behaviors, including the time and places of the events, thus providing a more valuable preemptive protection method for withstanding these behaviors before purchasing, which has the additional advantages of building the trust of the consumers on the brands, and building an excellent goodwill of the brands.

Contrary to the existing identification technique and prior article identification inventions direct to the consumers, the present invention enables the consumers to process complete and final article identification prior to purchasing and at the points of sales, while after the important step of the consumers for deciding to purchase the article thereof, further or to-be-finished actions are not needed, which not only has the important advantage that the consumers finish the complete verification of the article authenticity as a part of the purchasing decision thereof, and more importantly, eliminates the disadvantage of the prior art which usually depends on the consumers to process subsidiary after-purchasing identification which cannot be finished probably or delayed on the aspect of time. The invention also has an additional and practical advantage, i.e.: enabling an unlimited amount of consumers to identify the article but still make a decision of not purchasing due to any reason; therefore, the method caters the habits of daily consumers prior to purchasing and at the points of sales. This is achieved through a specific protocol used for the article identification system and purchasing tracing. The purchasing tracing needs an important step of the consumers for immediately determining to purchase or not purchase the article after receiving the identification result and before being capable of returning back to the system to continuously use or access. Similarly, because the negative identification result is received before purchasing, the consumers are benefited and protected. Providing the identification result update generated by the system and/or users enables the consumers and authorized users (such as brand owner, authorized representative) to take actions according to these behaviors, including to report such events to a jurisdictional agency to block or eliminate these fakes from selling.

A plurality of available mechanisms exist at present, through which the software component (item 5 in FIG. 2) on the identification device 1 may be updated. An embodiment of these mechanisms is a virtual environment of an online shop application, where the user can be connected to a special software library and initialize the automatic installation of new system software when the new system software becomes available. A preferred method of this update method relates to using the same (or similar) security connection used for updating the local identification database (step 7 or S7 in FIG. 4) from a server self-owned by a device supplier. This method avoids the probability of uncontrollable software source and unauthorized publishing. In any case, the main requirement on the system software updating mechanism is tightly controlling and identifying publishing of the system software, avoiding a third party to forge/control the software, as well as a specific publishing capacity of the brand owner by means of manual or automatic primary updating processing. A specific mechanism is not stipulated as long as the above requirements provided can be effectively satisfied.

Figure 6:
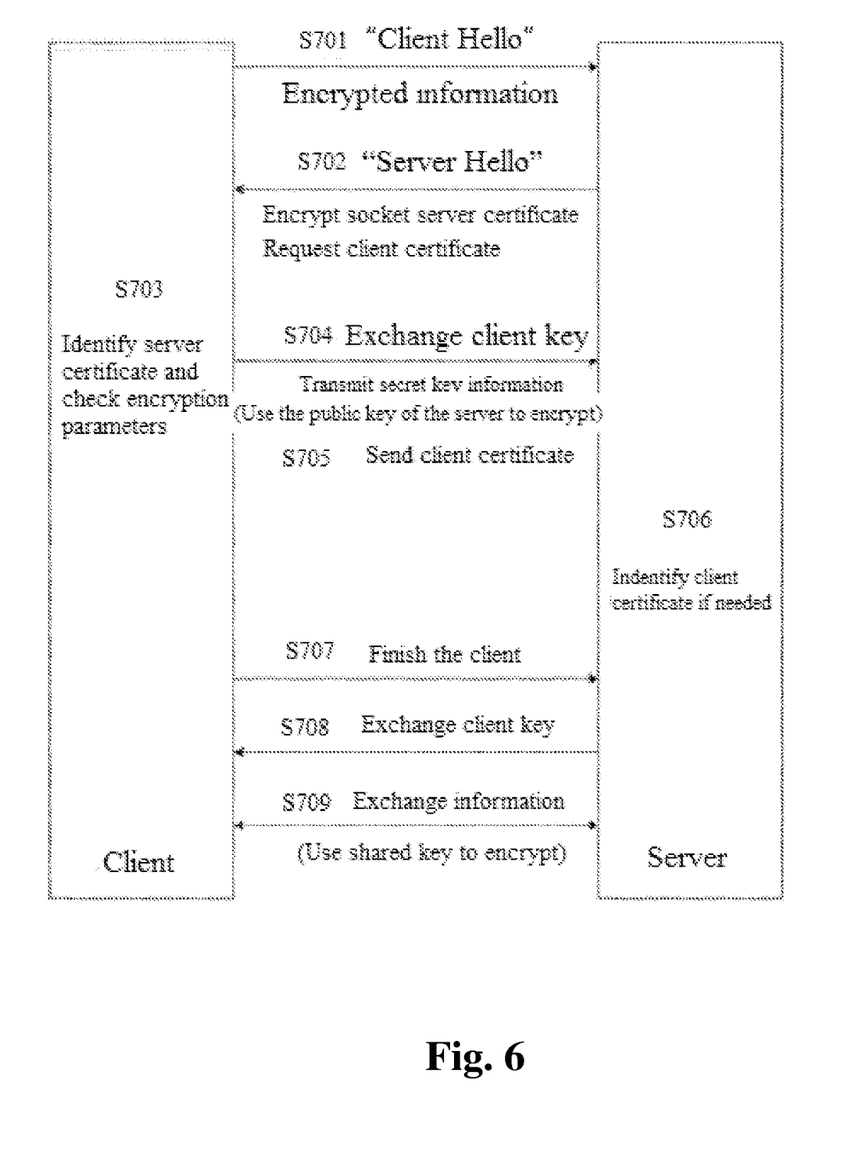
FIG. 6—data transport layer security, showing a block diagram of a data transport layer security protocol of the present invention, which includes data encryption and transport, for example identification processing software, result, database and information of other forms stored on the identification device and the central server as well as dynamic exchange and update between the two; the processing is one decomposition processing of step 7 (S7) in FIG. 4—namely encryption and dynamic update of local identification database.

FIG. 6 shows transport layer security of the present invention. The encrypted local database (S7 in FIG. 4) needs to be transported to the identification device 1 through a safe internet connection manner between the identification device and the central server 18. This connection can be performed in order at any specific point in time through admitted industrial standard security measures; however, FIG. 6 only shows an example of negotiatory processing of the current code protocol (TLS) well-know to those skilled in the art, and no specific methods are stipulated. Reliable communications, as prevention of intrusion and interception and decoding of the transmitted data are required.

In the step S701 of FIG. 6, the identification device ('client') transmits a client SSL version number, encryption settings, specific session data and other information required by the central server for using SSL to communicate with the client to the central server ('server'). In step S702, the central server makes responses through server SSL version number, code settings, specific session data and other information required by the client for using SSL to communicate with the central server.

The central server also transmits a self-owned certificate thereof; moreover, if the client requests central server resources which require the client to identify, then the central server requests the certificate of the client. The client uses the information transmitted by the central server to identify the central server.

All the data generated from the shake-hand process up to now and the pre-master secret of the client (cooperated with the central server, which depends on the code used) for creating a session are used; the public key of the central server (obtained from a server certificate transmitted in step S702) is used to encrypt the pre-master secret and transmit the encrypted pre-master secret to the central server in step S704. If the central server has already requested the client to identification in step S702, then the client signs another piece of data which is unique to this handshake process and is known to both the identification device and the central server. In such a case, the client together with the pre-master secret encrypted in step 704, transmits signature data and the self-owned certificate of the client to the central server.

Then the central server uses a private key thereof to decode the pre-master secret, and then performs a series of steps (the client also starts to perform these steps from the same pre-master secret) so as to generate a master secret.

The client transmits a message to the central server to notify the central server that the message from the client hereafter will use the session key to encrypt. In step S707, single encrypted message will be transmitted, indicating that the client portion of the handshake has been finished.

Then, the central client transmits a message to the client to notify the client that the message from the central server hereafter will use the session key to encrypt. In step S708, single encrypted message will be transmitted, indicating that the handshake central server part has been finished.

The SSL handshake is finished timely in this phase and session starts (step S709). During this period, any required data, system software or other related information can be safely forwarded between the identification device and the central server.

Data storage encryption relates to application of symmetrical encryption having a block cipher form and at least using a 128-bit key length.

The invention claimed is:

1. A method for determining authenticity of an article of manufacture, comprising the steps of:
    illuminating at least a portion of the article using a mobile device to activate a security tracer present on the portion of the article;
    capturing at least one image formed by the security tracer using a camera of the mobile device; and
    comparing the at least one image or at least one characteristic extracted from the at least one image to reference data using a processor in communication with the camera to determine whether the article is authentic;
    wherein the security tracer comprises a phosphor.

2. The method of claim 1, wherein the mobile device comprises a mobile phone, a personal digital assistant (PDA), or a tablet device.

3. The method of claim 1, wherein the processor comprises a computer system remote from the mobile device.

4. The method of claim 1, wherein the processor processes at least one of spectrum and intensity information.

5. The method of claim 1, wherein the step of illuminating at least the portion of the article comprises illuminating at least a portion of a label applied to the article to activate a security tracer present in at least a portion of the label.

6. The method of claim 5, wherein the label includes indicia.

7. The method of claim 1, further comprising querying a computer system to obtain information about the article using information from the at least one image or the at least one characteristic extracted from the at least one image.

8. The method of claim 1, further comprising capturing an initial image of the at least one portion of the article prior to or after illuminating the at least one portion of the article.

9. The method of claim 1, wherein the security tracer is in the form of at least one of an image, color, shape, alphanumeric code, digital code, sign, or word forms.

10. A system for determining authenticity of an article of manufacture, comprising:
    a mobile device having an illumination unit and a camera;
    a processor; and
    a software component executed by the mobile device, the software component causing the mobile device to:
        illuminate at least a portion of the article using the illumination unit to activate a security tracer present on the portion of the article;
        capture at least one image formed by the security tracer using the camera; and
        compare the at least one image or at least one characteristic extracted from the at least one image to reference data using the processor to determine whether the article is authentic;
    wherein the security tracer comprises a phosphor.

11. The system of claim 10, wherein the mobile device comprises a mobile phone, a personal digital assistant (PDA), or a tablet.

12. The system of claim 10, wherein the processor comprises a computer system remote from the mobile device.

13. The system of claim 10, wherein the processor processes at least one of spectrum and intensity information.

14. The system of claim 10, wherein the software component causes the mobile device to illuminate at least a portion of a label applied to the article to activate a security tracer present in at least a portion of the label.

15. The system of claim 14, wherein the label includes indicia.

16. The system of claim 10, wherein the software component queries a computer system to obtain information about the article using information from the at least one image or the at least one characteristic extracted from the at least one image.

17. The system of claim 10, wherein the software component causes the mobile device to capture an initial image of the at least one portion of the article prior to or after illuminating the at least one portion of the article.

18. The system of claim 10, wherein the security tracer is in the form of at least one of an image, color, shape, alphanumeric code, digital code, sign, or word forms.

* * * * *